United States Patent [19]
Eto et al.

[11] Patent Number: 5,473,389
[45] Date of Patent: Dec. 5, 1995

[54] Y/C SEPARATOR USING 3-D, 2-D AND 1-D FILTERS

[75] Inventors: Toru Eto; Tadao Fujita, both of Kanagawa, Japan

[73] Assignee: Sony Corporation, Tokyo, Japan

[21] Appl. No.: 148,350

[22] Filed: Nov. 8, 1993

[30]     Foreign Application Priority Data

Nov. 10, 1992  [JP]  Japan .................................. 4-299975
Nov. 11, 1992  [JP]  Japan .................................. 4-301201

[51] Int. Cl.$^6$ ................................................. H04N 9/78
[52] U.S. Cl. ........................................ 348/669; 348/670
[58] Field of Search ................................... 348/663, 664, 348/665, 666, 667, 668, 669, 670; H04N 9/64, 9/78

[56]              References Cited

U.S. PATENT DOCUMENTS

| | | | |
|---|---|---|---|
| 4,617,589 | 10/1986 | Weckenbrock | 348/666 |
| 4,930,012 | 5/1990 | Fujita | 348/666 X |
| 4,972,259 | 11/1990 | Motoe et al. | 348/666 X |
| 5,093,715 | 3/1992 | Tokuhara et al. | 348/667 |
| 5,097,321 | 3/1992 | Stern et al. | 348/668 X |
| 5,155,582 | 10/1992 | Tokoi et al. | 348/663 |

Primary Examiner—Victor R. Kostak
Assistant Examiner—John W. Miller
Attorney, Agent, or Firm—Jay H. Maioli

[57]              ABSTRACT

A Y/C separating filter apparatus for outputting a carrier chrominance signal and a luminance signal from a color video signal supplied thereto comprises first and second three-dimensional filters for subtracting the color video signal and signals of one or two- frame period-advanced or delayed signals from each other to obtain first and second carrier chrominance signals, a selector circuit for selecting the first and second carrier chrominance signals and an average third carrier chrominance signal to obtain the carrier chrominance signal, and a judging circuit for judging first and second correlations between the color video signal and first or second frame period-advanced or delayed signals, wherein the selector circuit is selected in response to a judged result of the judging circuit, the selector circuit selects the first carrier chrominance signal when the first correlation is higher than the second correlation, the selector circuit selects the second carrier chrominance signal when the second correlation is higher than the first correlation, and the selector circuit selects the third carrier chrominance signal when the first and second correlations are substantially equal to each other.

5 Claims, 8 Drawing Sheets

Y/C SEPARATOR USING 3-D, 2-D AND 1-D FILTERS

BACKGROUND OF THE INVENTION

1. Field of the Invention

The present invention relates to an Y/C (luminance signal/chrominance signal) separator.

2. Description of the Prior Art

A conventional Y/C separating filter apparatus comprises a three-dimensional filter for obtaining a carrier chrominance signal by subtracting and averaging an NTSC composite color video signal formed of a low band luminance signal, a high band chrominance signal, one frame period-delayed and one frame period-advanced signals, a two-dimensional filter (comb filter) for obtaining a carrier chrominance signal by subtracting the composite color video signal and a signal having a different one horizontal cycle period, a one-dimensional filter (bandpass filter) having a frequency characteristic in which a carrier chrominance signal from the composite color video signal is passed, a selector circuit for selecting respective outputs of the three-dimensional, two-dimensional and one-dimensional filters, a motion detector circuit for detecting a motion of the composite color video signal, and a judging circuit for determining whether or not a line correlation of the composite color video signal is higher than the reference value. The selector circuit selects the output of the three-dimensional filter when the motion is not detected, and selects the outputs of the two-dimensional filter and the one-dimensional filter when the motion is detected. The selector circuit further selects the output of the two-dimensional filter when the line correlation of the composite color video signal is higher than the reference value, and the selector circuit selects the output of the one-dimensional filter when the line correlation of the composite color video signal is lower than the reference value to thereby obtain the carrier chrominance signal. The luminance signal is obtained by subtracting the carrier chrominance signal from the composite color video signal.

Based upon the above description of the prior art, let us consider the case where the contents of a composite color video signal of a still picture are the same up to the fields . . . , n–4, n–3, n–2, n–1 and that the contents thereof are changed from the next field n and that the same contents are continued in the fields n, n+1, n+2, n+3, . . . , as shown in FIG. 1 of the accompanying drawings.

With the above-mentioned arrangement, up to the fields n–2, n–1, n, n+1, one of the outputs which result from subtracting the composite color video signal from the one frame cycle period delayed and advanced signals becomes a signal which results from subtracting the still picture signals of the same content and the other becomes a content which results from subtracting the still picture signals of different contents. Accordingly, an average value of such signals becomes meaningless. Therefore, in that case, the selector circuit cannot select the output of the three-dimensional filter and must select the output of either the two-dimensional filter or the one-dimensional filter. There is then the risk that a cross-color or dot-interference occurs in a reproduced picture of such composite color video signal.

OBJECTS AND SUMMARY OF THE INVENTION

Therefore, it is an object of the present invention to provide an improved Y/C separating filter apparatus in which the aforesaid shortcomings and disadvantages encountered with the prior art can be eliminated.

More specifically, it is an object of the present invention to provide a Y/C separating filter apparatus in which an output carrier chrominance signal and an output luminance signal can be obtained from a composite color video signal supplied thereto.

It is another object of the present invention to provide a Y/C separating filter apparatus in which a resolution of a reproduced picture can be prevented from being lowered.

It is still another object of the present invention to provide a Y/C separating filter apparatus in which the occurrence of a cross-color in a reproduced picture can be reduced.

According to a first aspect of the present invention, there is provided a Y/C separating filter apparatus for outputting a carrier chrominance signal and a luminance signal from a color video signal supplied thereto. This apparatus comprises first and second three-dimensional filters for subtracting the color video signal and signals of one or two- frame period-advanced or delayed signals from each other to obtain first and second carrier chrominance signals, a selector circuit for selecting the first and second carrier chrominance signals and an average third carrier chrominance signal to obtain the carrier chrominance signal, and a judging circuit for judging first and second correlations between the color video signal and first or second frame period-advanced or delayed signals. When the selector circuit is selected in response to a judged result of the judging circuit, the selector circuit then selects the first carrier chrominance signal when the first correlation is higher than the second correlation. The selector circuit selects the second carrier chrominance signal when the second correlation is higher than the first correlation. The selector circuit selects the third carrier chrominance signal when the first and second correlations are substantially equal to each other.

According to a second aspect of the present invention, there is provided a Y/C separating filter apparatus for outputting a carrier chrominance signal and a luminance signal from a color video signal supplied thereto. This apparatus comprises a three-dimensional filter for subtracting the color video signal and signals of one or two-frame period-advanced or delayed signals from each other to output first and second carrier chrominance signals and an average third carrier chrominance signal, a two-dimensional filter for subtracting the color video signal and a signal which is different in one or two horizontal periods from each other to output a carrier chrominance signal a, one-dimensional filter having a frequency characteristic in which the carrier chrominance signal of the color video signal supplied thereto is passed, a two-dimensional/one-dimensional filter for judging a line correlation of the color video signal and outputting a fourth carrier chrominance signal by selecting a carrier chrominance signal from the two-dimensional filter when the line correlation is high or by selecting a carrier chrominance signal from the one-dimensional filter when the line correlation is low, a selector circuit for selecting the first, second, third and fourth carrier chrominance signals to obtain the output carrier chrominance signal, and a judging circuit for judging first and second correlations between the color video signal and one or two-frame period delayed or advanced signals. When the selector circuit is selected in response to a judged result of the judging circuit, the selector circuit then selects the first carrier chrominance signal when the first correlation is higher and the second correlation is higher than the reference value. The selector circuit selects the second carrier chrominance signal when the second correlation is higher than the first correlation and higher than the reference value. The selector circuit selects the third carrier chrominance signal when the first and second correlations are substantially equal to each other and higher than the reference value, and the selector circuit selects the fourth carrier chrominance signal when the first and second correlations are both lower than the reference value.

According to a third aspect of the present invention, there is provided a Y/C separating filter apparatus. This apparatus comprises a three-dimensional filter for outputting a carrier chrominance signal output by subtracting a color video signal and one or two-frame period delayed or advanced signal, a two-dimensional filter for outputting a carrier chrominance signal by subtracting a color video signal and a signal which is different in one or two frame periods, a one-dimensional filter having a frequency characteristic in which the carrier chrominance signal from the color video signal is passed, a first selector circuit for selecting outputs of the one-dimensional filter and the two-dimensional filter, a second selector circuit for obtaining an output carrier chrominance signal by selecting the output of the three-dimensional filter and the output of the first selector circuit, a motion detector circuit for detecting a motion of the color video signal, a judging circuit for determining whether or not a line correlation of the color video signal is higher than a reference value, a reference value generator for varying the reference value in response to a characteristic of the color video signal, and a subtracter for obtaining an output luminance signal by subtracting the color video signal and the output of the second selector circuit. The second selector circuit is controlled by a detected output of the motion detector circuit, wherein the second selector circuit selects an output of the three-dimensional filter when a motion of the color video signal is not detected, but selects an output of the first selector circuit when a motion of the color video signal is detected. The first selector circuit is controlled by the output of the judging circuit. The second selector circuit selects an output of the one-dimensional filter when the correlation is lower than the reference value but selects an output of the two-dimensional filter when the correlation is higher than the reference value.

In accordance with a fourth aspect of the present invention, there is provided a Y/C separating filter apparatus. This apparatus comprises a three-dimensional filter for outputting a carrier chrominance signal by subtracting a color video signal and a one or two frame period-delayed or advanced signal, a two-dimensional filter for outputting a carrier chrominance signal by subtracting the color video signal and a signal which is different from that of the color video signal by one or two horizontal periods, a one-dimensional filter having a frequency characteristic for passing a carrier chrominance signal from the color video signal supplied thereto, a first selector circuit for selecting outputs of the one-dimensional filter and the two-dimensional filter, a second selector circuit for obtaining an output carrier chrominance signal by selecting an output of the three-dimensional filter and an output of the first selector circuit, a third selector circuit for obtaining a carrier chrominance signal by selecting the outputs of the first and second selector circuits on the basis of a mode switching signal, a motion detector circuit for detecting a motion of the color video signal, a judging circuit for determining whether or not a line correlation of the color video signal is higher than a reference value, a reference value generator being capable of varying the reference value by the mode switching signal, and a subtracter for obtaining an output luminance signal by subtracting the color video signal and the output of the third selector circuit, wherein the second selector circuit is controlled by a detected output of the motion detector circuit. The second selector circuit selects the output of the three-dimensional filter when a motion of the color video signal is not detected, but selects the output of the first selector circuit when a motion of the color video signal is detected. The first selector circuit is controlled by an output of the judging circuit. The first selector circuit selects the output of the one-dimensional filter when the line correlation is lower than the reference value, and selects the output of the two-dimensional filter when the line correlation is higher than the reference value.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENTS

Embodiments of the present invention will now be described with reference to FIGS. 2 to 8. In this case, the signal processing may be either the analog processing or the digital processing.

Figure 1:
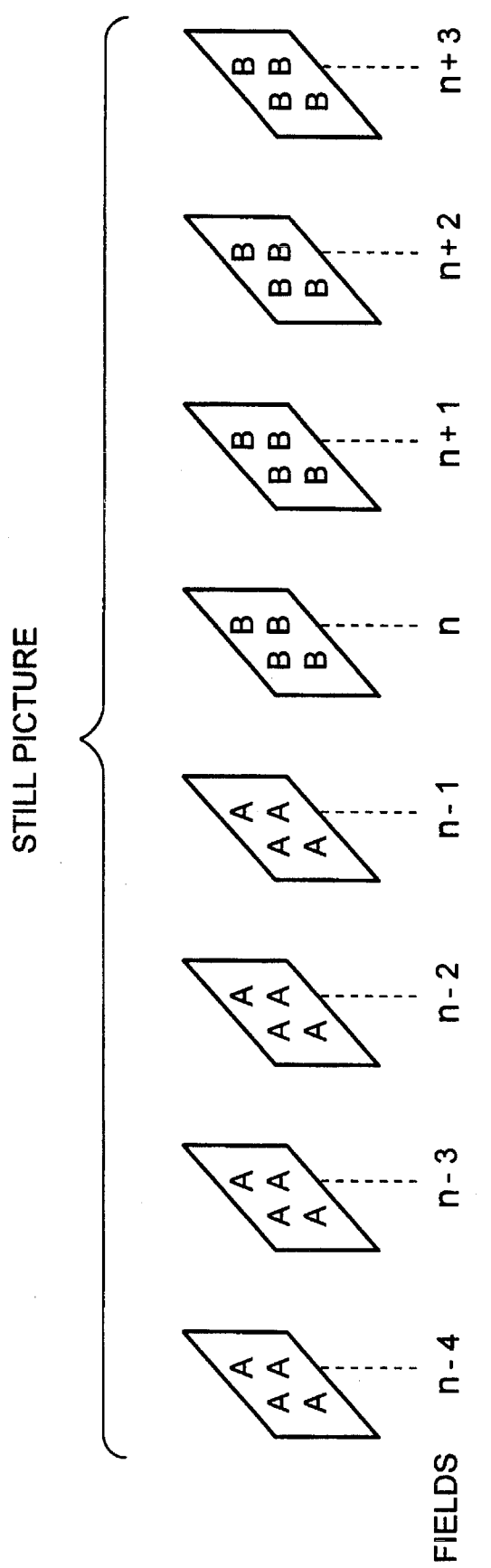
FIG. 1 is a schematic diagram used to explain the shortcomings and disadvantages encountered with the prior art.
Figure 2:
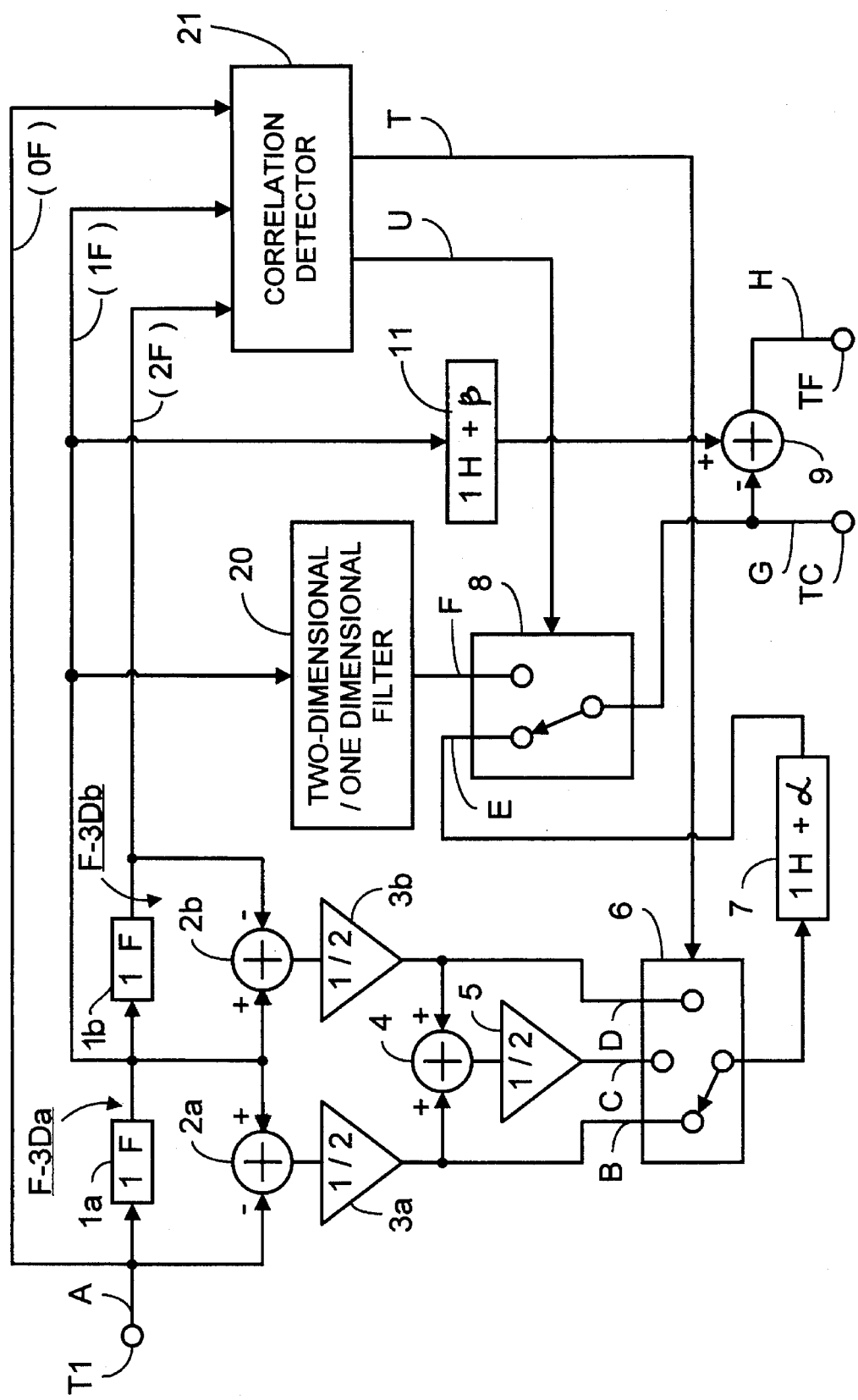
FIG. 2 is a schematic block diagram showing a Y/C separating filter apparatus according to a first embodiment of the present invention.

As shown in FIG. 2, there is provided an input terminal T1 to which there is supplied an NTSC composite color video signal A. This NTSC composite color video signal A is formed of a low band luminance signal and a high band carrier chrominance signal. A high band portion of the band of the luminance signal and a low band portion of the band of the carrier chrominance signal are overlapped partly.

In FIG. 2, reference symbols F-3Da, F-3Db respectively designate three-dimensional filters. In the three-dimensional filter F-3Da, a subtracter 2a subtracts the composite color video signal supplied to the input terminal T1 from the composite color video signal supplied to the input terminal T1 which is delayed by a one frame delay device 1a to thereby separate a carrier chrominance signal from the composite color video signal. In the three-dimensional filter F-3Db, a subtracter 2b subtracts the composite color video signal supplied to the input terminal T1 which is delayed by one frame delay devices 1a, 1b, from the signal supplied to the input terminal T1 which is delayed by the one frame delay device 1a to thereby separate the carrier chrominance signal from the composite color video signal. The respective outputs of the three-dimensional filters F-3Da, F-3Db are supplied through ½ multipliers 3a, 3b to fixed contacts of a selector circuit 6 as carrier chrominance signals B and D, respectively. The respective outputs of the three-dimensional filters F-3Da, F-3Db are supplied through ½ multipliers 3a, 3b to an adder 4. An added output of the adder 4 is supplied through a ½ multiplier 5 to a fixed contact of the selector circuit 6 as a carrier chrominance signal C. Incidentally, this selector circuit 6 is operated under the control of a control signal supplied from a frame correlation detector 21, as will be described later on.

An output of the selector circuit 6 is supplied through a delay compensator 7 having a delay time of 1H+α (H is the horizontal cycle period and α is the very small time) to a fixed terminal of another selector circuit 8 as a carrier chrominance signal E.

The composite color video signal from the delay device 1a is supplied to a two-dimensional/one-dimensional filter 20 whose carrier chrominance signal is supplied to a fixed terminal of the selector circuit 8 as a carrier chrominance signal F. This selector circuit 8 also is operated under the control of the control signal from the correlation detector 21. An output of the selector circuit 8 is developed at an output terminal TC as an output carrier chrominance signal G. The composite color video signal from the delay device 1a is supplied through a delay compensator 11 having a delay time of 1H+β (β is the very small time) to a subtracter 9 to which the output carrier chrominance signal G from the output terminal TC is supplied. Thus, the subtracter 9 subtracts the latter from the former, and a subtracted output from the subtracter 9 is developed at an output terminal TF as an output luminance signal H.

Figure 3:
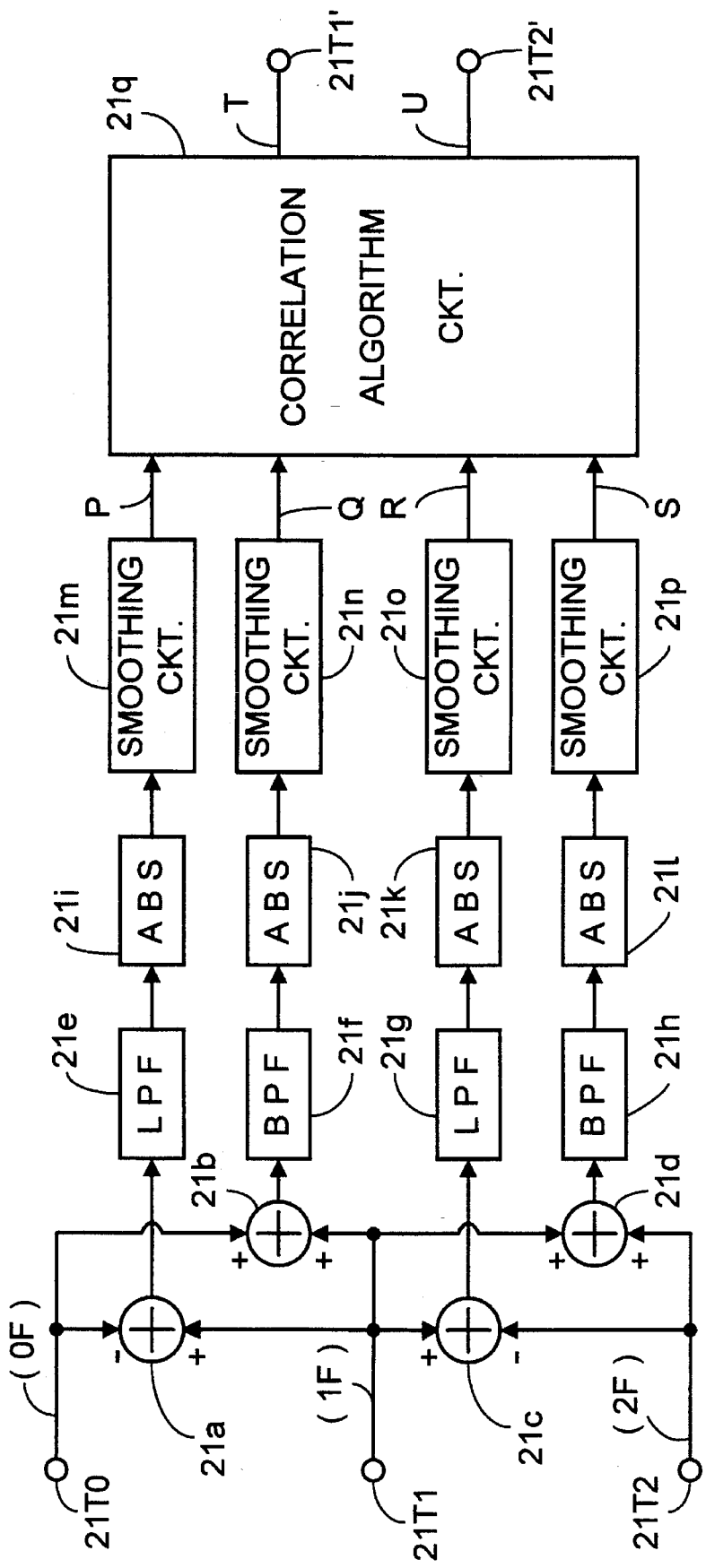
FIG. 3 is a schematic block diagram showing a correlation detector used in the first embodiment of the present invention.

The correlation detector 21 and selecting operation of the selector circuit 6 will be described with reference to FIGS. 3 and 4. As shown in FIG. 3, assuming that (0F) represents the composite color video signal supplied to the input terminal T1, (1F) represents the color video signal delayed by one frame cycle period by the delay device 1a and that (2F) represents the composite color video signal further delayed by one frame cycle period by the delay device 1b, then these composite color video signals (0F), (1F), (2F) are respectively supplied to input terminal 21T0, 21T1, 21T2 of the correlation detector 21.

The subtracter 21 subtracts the signal (0F) from the signal (1F), and a subtracted output from the subtracter 21 is supplied to a low-pass filter (LPF) 21e, in which the carrier chrominance signal is blocked. Thereafter, the output from the low-pass filter 21e is supplied through a series circuit of an absolute value generating circuit (ABS) 21i and a smoothing circuit 21m to a correlation algorithm circuit 21q. An adder 21b adds the signal (0F) and the signal (1F), and an added output from the adder 21b is supplied to a bandpass filter (BPF) 21f, in which a luminance signal is blocked. An output of the bandpass filter 21f is supplied through a series circuit of an absolute value generating circuit (ABS) 21j and a smoothing circuit 21n to the correlation algorithm circuit 21q. A subtracter 21c subtracts the signal (2F) from the signal (1F), and a subtracted output from the subtracter 21c is supplied to a low-pass filter (LPF) 21g, in which a carrier chrominance signal is blocked. An output from the low-pass filter 21g is supplied through a series circuit of an absolute value generating circuit (ABS) 21k and a smoothing circuit 21o to the correlation algorithm circuit 21q. An adder 21d adds the signal (0F) and the signal (1F), and an added output from the adder 21d is supplied to a bandpass filter (BPF) 21f, in which a luminance signal is blocked. An output from the bandpass filter 21f is supplied through a series circuit of the absolute value generating circuit (ABS) 21j and a smoothing circuit 21n to the correlation algorithm circuit 21q.

Therefore, assuming that P, Q, R, S, represent the outputs of the smoothing circuits 21m, 21n, 21o and 21p, respectively, then the signal P is a direct current voltage corresponding to the difference of the luminance signal between the composite color video signals (1F) and (0F). The signal Q is a direct current voltage corresponding to a difference of a carrier chrominance signal between the composite color video signals (1F) and (0F). The signal R is a direct current voltage corresponding to a difference of the luminance signal between the composite color video signals (1F) and (2F). The signal S is a direct current voltage corresponding to a difference of the carrier chrominance signal between the composite color video signals (1F) and (2F).

Control signals T and U from output terminals 21T1', 21T2' of the correlation algorithm circuit 21q are respectively supplied to the selector circuits 6 and 8. The algorithm of the correlation algorithm circuit 21q will be described with reference to the flowchart of FIG. 4. In FIG. 4, reference symbol K1 depicts a reference level that is used to determine when the correlation of the luminance signal is higher than the reference level. The reference level K1 is a positive integer near 0. Reference symbol K2 is a reference level that is used to determine whether the correlation of the carrier chrominance signal is higher than the reference level. The reference level K2 also is a positive integer near 0.

Figure 4:
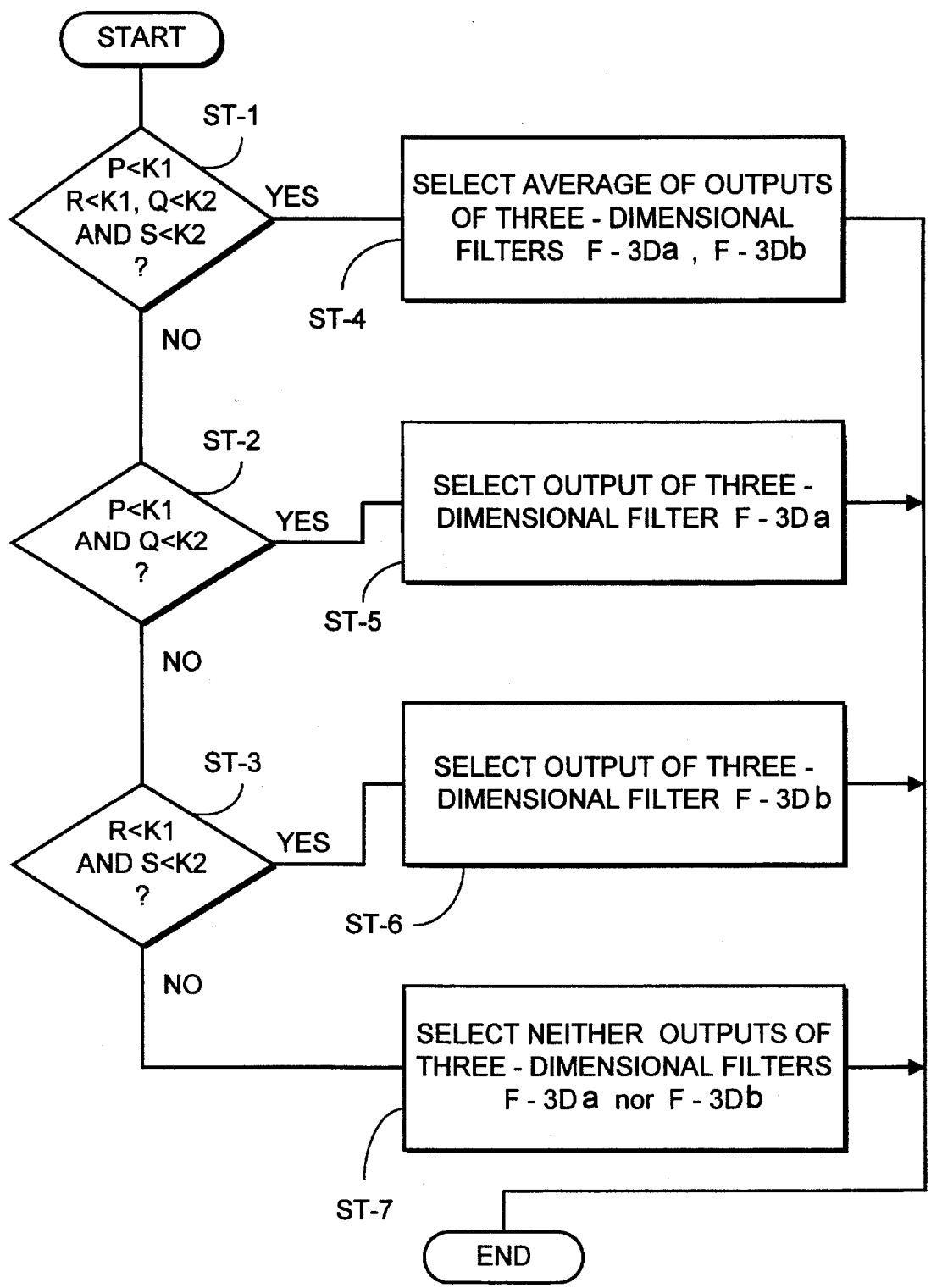
FIG. 4 is a flowchart to which reference will be made in explaining an algorithm of the correlation detector shown in FIG. 3.

As shown in FIG. 4, following the start of operation, it is determined in decision step ST-1 whether P<K1 (correlation of the luminance signal is high), R<K1 (correlation of the luminance signal is high), Q<K2 (correlation of the carrier chrominance signal is high) and S<K2 (correlation of the carrier chrominance signal is high). If a NO is output at decision step ST-1, then the processing proceeds to the next decision step ST-2. If on the other hand a YES is output at decision step ST-1, then the processing proceeds to step ST-4. In step ST-4, an average value of the outputs of the three-dimensional filters F-3Da, F-3Db, i.e., the carrier chrominance signal C, is selected by the selector circuit 6 under the control of the control signal T. In this case, the carrier chrominance signal E is selected by the selector circuit 8 under the control signal of the control signal U. Then, the processing is ended.

It is determined in decision step ST-2 whether or not P<K1, Q<K2 (where R≧K1 and S≧K2). If a NO is output at decision step ST-2, then the processing proceeds to the next decision step ST-3. If on the other hand a YES is output at decision step ST-2, then the processing proceeds to step ST-5. In step ST-5, the carrier chrominance signal B that is the output from the three-dimensional filter F-3Da is selected by the selector circuit 6 under the control of the control signal T. In this case, the carrier chrominance signal E is selected by the selector circuit 8 under the control of the control signal U. Then, the processing is ended.

It is determined in decision step ST-3 whether or not R<K1 and S<K2 (where P≧K1 and Q≧K2) are established. If a NO is output at decision step ST-3, then the processing proceeds to step ST-7. If on the other hand a YES is output at decision step ST-3, then the processing proceeds to step ST-6. In step ST-6, the carrier chrominance signal C that is the output of the three-dimensional filter F-3Db is selected by the selector circuit 6 under the control of the control signal T. In this case, the carrier chrominance signal E is selected by the selector circuit 8 under the control of the control signal U. Then, the processing is ended.

In step ST-7, if neither of the outputs of the three-dimensional filters F-3Da, F-3Db are selected, and the carrier chrominance signal F that is the output of the two-dimensional/one-dimensional filter 20 is selected by the selector circuit 8 under the control of the control signal U. Then, the processing is ended.

While the carrier chrominance signal from the one-dimensional filter F-1D is supplied to the two-dimensional filters F-2Da, F-2Db as described above, the present invention is not limited thereto and the composite color video signal from the delay device 1a may be directly supplied thereto.

While the composite color video signal is the NTSC composite color video signal as described above, the present invention is not limited thereto. That is, it is sufficient that the delay times of the delay devices 1a, 1b used in the three-dimensional filters F-3Da, F-3Db may be set to be 2-frame cycle periods, respectively, and that the delay devices 11a, 11b used in the two-dimensional filters F-2Da, F-2Db may be set to two-horizontal cycle periods, respectively. In that case, the correlation detector 21 may be supplied with the composite color video signal having the delay time differences of two-frame cycle periods from the three-dimensional filters F-3Da, F-3Db.

Figure 5:
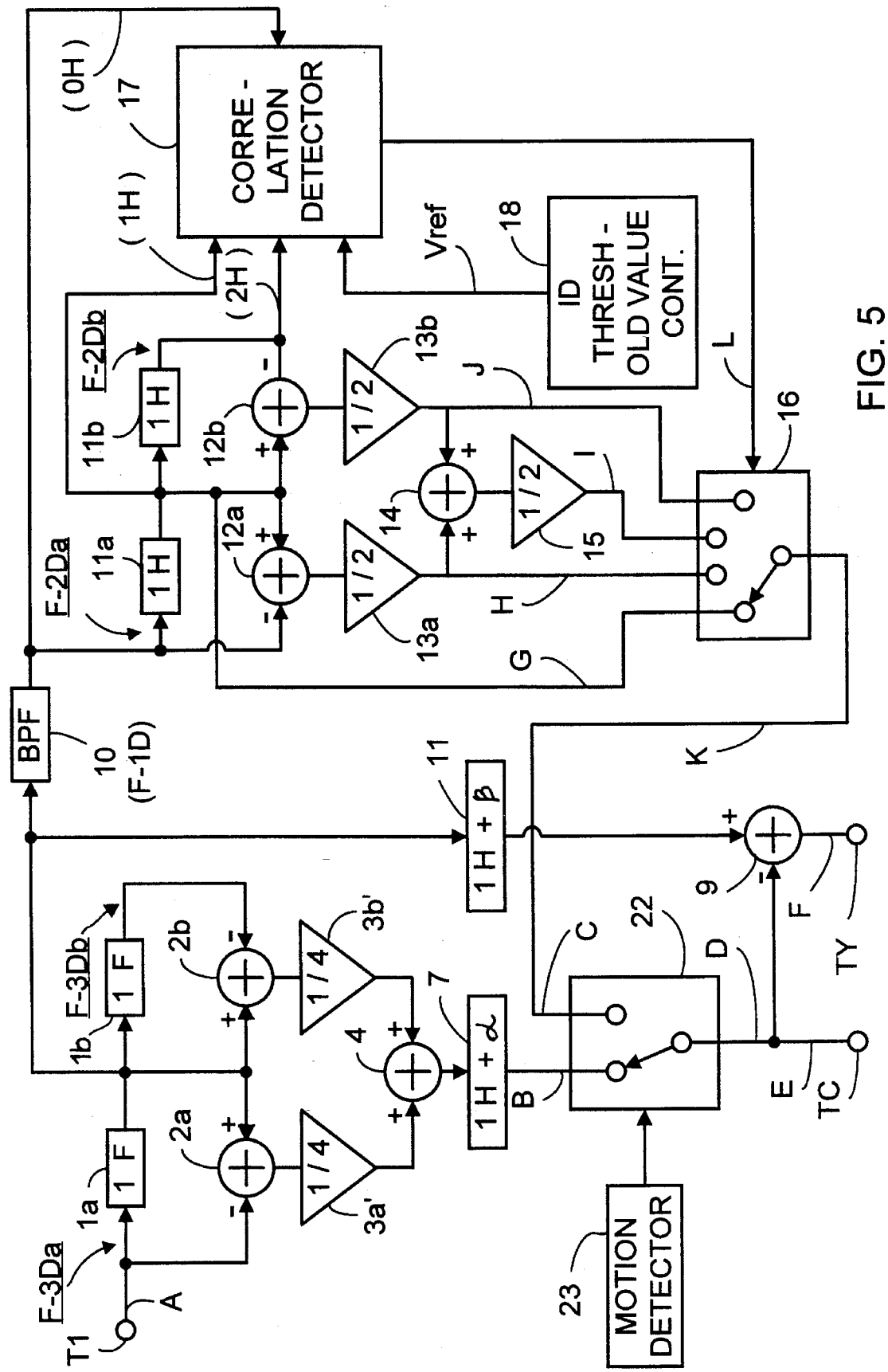
FIG. 5 is a schematic block diagram showing a Y/C separating filter apparatus according to a second embodiment of the present invention.

Other embodiment of the present invention will hereinafter be described with reference to FIG. 5. As shown in FIG. 5, the respective outputs of the three-dimensional filters F-3Da, F-3Db are supplied through ¼ multipliers 3a', 3b' to the adder 4, in which they are added and then supplied through the delay compensator 7 having the delay time of 1H+α (where H is the horizontal cycle period and α is the very small delay time) to one fixed contact of a selector circuit 22 as the carrier chrominance signal B.

A signal which results from delaying the composite color video signal A supplied from the input terminal T1 by one frame cycle period by the delay device 1a is supplied through the delay compensator 8 having a delay time of 1H+β (where β is the very small time) and the subtracter 9 to the bandpass filter 10 (one-dimensional filter F-1D) which then passes through the carrier chrominance signal, in which a carrier chrominance signal is separated from the composite color video signal.

In FIG. 5, reference symbols F-2Da, F-2Db depict two-dimensional filters (comb filters), respectively. In the two-dimensional filter F-2Da, a subtracter 12a subtracts the carrier chrominance signal of the one-dimensional filter D-1D from the signal G which results from delaying the carrier chrominance signal of the one-dimensional filter F-1D by a delay device 11a by one horizontal cycle period, thereby obtaining the carrier chrominance signal. In the two-dimensional filter F-2Db, the subtracter 12b subtracts the carrier chrominance signal which results from delaying the carrier chrominance signal of the one-dimensional filter F-1D by the delay devices 1a, 1b having the delay times of one horizontal cycle period from the signal G which results from delaying the carrier chrominance signal of the one-dimensional filter F-1D by the delay device 11a having the delay time of one horizontal cycle period, thereby obtaining the carrier chrominance signal.

The carrier chrominance signals from the two-dimensional filters F-2Da, F-2Db are supplied to ½ multipliers 13a, 13b which derive carrier chrominance signals H, J whose levels are reduced to ½, respectively. These carrier chrominance signals H, J are respectively to fixed contacts of a selector circuit 16, and also supplied to an adder 14. Then, the added output from the adder 14 is supplied to a ½ multiplier 15 which derives a carrier chrominance signal I whose level is reduced to ½. This carrier chrominance signal I is supplied to a fixed contact of the selector circuit 16.

Also, the signal G which results from delaying the carrier chrominance signal from the one-dimensional filter F-1D by the delay device 11a of the two-dimensional filter F-2Da by one horizontal cycle period is supplied to the fixed contact of the selector circuit 16.

The correlation detector 17 detects line correlation between the carrier chrominance signal from the one-dimensional filter F-1D and the preceding and succeeding signals. Then, the detected line correlation is compared with a reference level from a one-dimensional (1D) threshold value controller 18. On the basis of the compared result, one of the respective carrier chrominance signals G, H, I and J supplied to the selector circuit 16 is selected. Then, the selected carrier chrominance signal K is supplied to the selector circuit 22 as the carrier chrominance signal C. When a motion of the composite color video signal supplied to the input terminal T1 is not detected by the motion detector 23, the carrier chrominance signal B is selected. When a motion of the composite color video signal is detected by the motion detector 23, the carrier chrominance signal C is selected. Then, the output carrier chrominance signal E is output to the output terminal TC. The motion detector 23 generates the absolute value of the difference between the composite color video signal supplied to the input terminal T1 and the signal which is different from the composite color video signal by 4-frame cycle periods or after having compared the absolute value with the reference level.

Then, the subtracter 9 subtracts the output carrier chrominance signal E from the signal which results from delaying the composite color video signal supplied from the input terminal T1 by the delay device 1a by one frame cycle period to thereby output the output carrier chrominance signal F from the output terminal TY.

Figure 6:
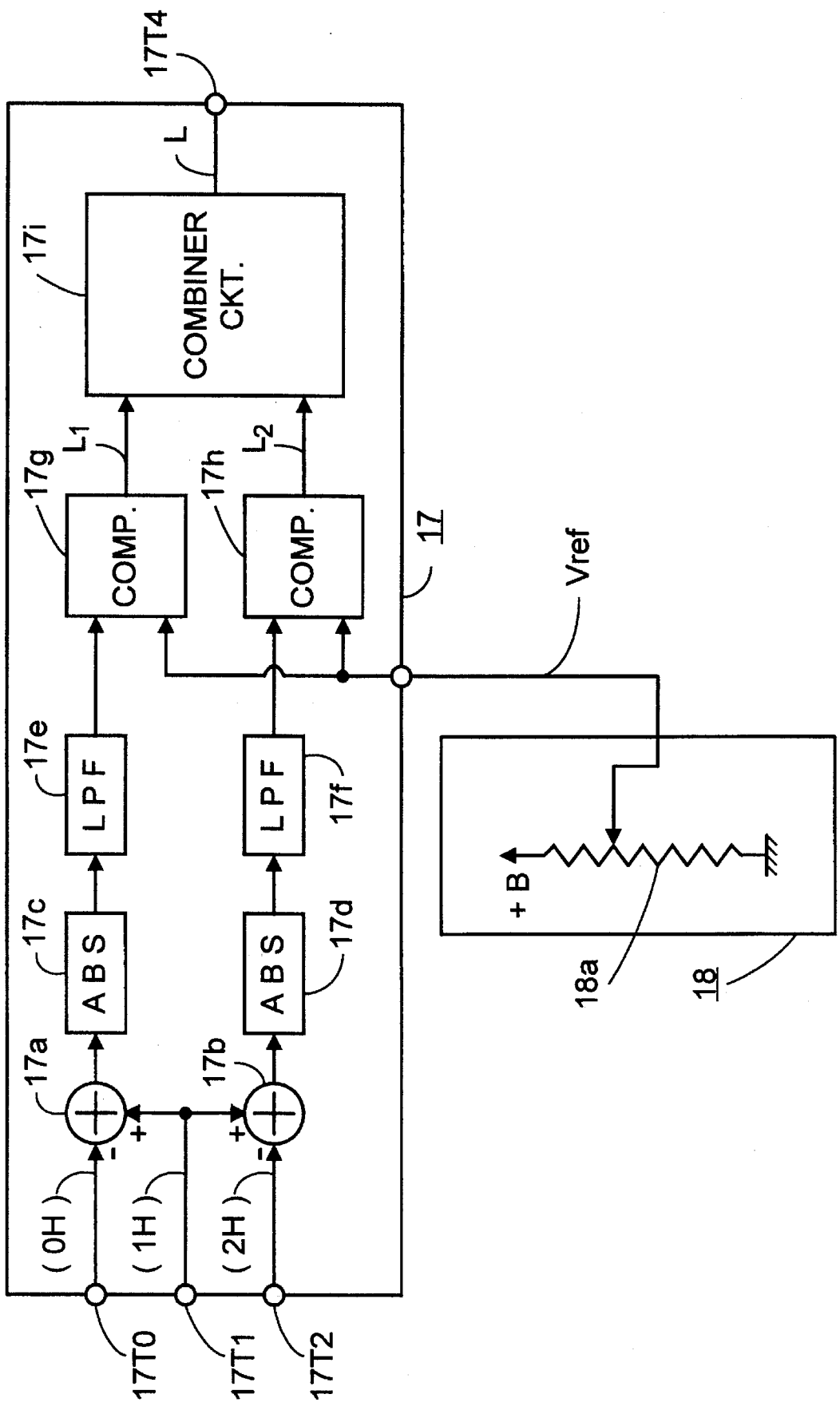
FIG. 6 is a schematic block diagram showing a correlation detector and an ID threshold value controller used in the second embodiment of the present invention.

The correlation detector 17 will be described next with reference to also FIG. 6. As shown in FIG. 6, the correlation detector 17 is supplied at its input terminals 17T0, 17T1, 17T2 with the carrier chrominance signal (0H) from the one-dimensional filter F-1D, the carrier chrominance signal (1H) which results from the carrier chrominance signal (0H) by one horizontal cycle period and the carrier chrominance signal (2H) which results from delaying the carrier chrominance signal (1H) by further one horizontal cycle period. Subtracters 17a, 17b subtract the carrier chrominance signals (0H) and (2H) from the carrier chrominance signal (1H), respectively. The respective subtracted outputs from the subtracters 17a, 17b are carrier chrominance signals, each of which contains a non-correlation luminance signal component. These subtracted outputs are supplied through absolute value generating circuits (ABS) 17c, 17d to low-pass filters 17e, 17f, in which they are integrated and then supplied to level comparators 17g, 17h. Then, they are compared with a reference level Vref from the ID threshold value controller 18. Then, the compared outputs from the level comparators 17g, 17h are supplied to a combiner circuit 17i, in which they are combined with each other. Thus, a control signal L is developed at an output terminal 17T4 and then fed to the selector circuit 16 of FIG. 2.

The ID threshold value controller 18 is formed of a potentiometer 18a connected between a power supply source +B and the ground. The reference level Vref is obtained from a movable contact of the potentiometer 18a.

The way that the selector circuit 16 is selected in response to the control signal K from the correlation detector 17 will be described next. Compared outputs which result from subtracting the outputs of the low-pass filters 17e, 17f from the reference level Vref by the comparators 17g, 17h are set to $L_1$, $L_2$. Then, the control signal L corresponding to the status of the compared results $L_1$, $L_2$ is obtained and then supplied to the selector circuit 16 which then selects one of the carrier chrominance signals G, H, I or J.

When the compared outputs $L_1$ and $L_2$ are set in $L_1$, $L_2 \leq 0$, the combiner circuit 17i determines that a video signal of a certain line (carrier chrominance signal having a high band component of a non-correlation luminance signal) and video signals of preceding and succeeding lines have no correlation therebetween. Thus, the carrier chrominance signal G is selected by the selector circuit 16.

When the compared outputs $L_1$ and $L_2$ are set in $L_1 > 0$ and $L_2 \leq 0$ or $L_1 > L_2 > 0$, the combiner circuit 17i determines that the video signal of a certain line and the video signal of the succeeding line have a high correlation therebetween and the above-mentioned video signal and the video signal of the preceding line have no correlation or a low correlation therebetween. Thus, the carrier chrominance signal H is selected by the selector circuit 16.

When the compared outputs $L_1$ and $L_2$ are set in $L_2 > 0$ and $L_1 \leq 0$ or $L_2 > L_1 > 0$, the combiner circuit 17i determines that the video signal of a certain line and the video signal of the preceding line have a high correlation therebetween and that the above-mentioned video signal and the video signal of the succeeding line have no correlation therebetween or have a low correction therebetween. Thus, the carrier chrominance signal J is selected by the selector circuit 16.

When the compared outputs $L_1$ and $L_2$ are set in $L_1 = L_2 > 0$, the combiner circuit 17i determines that the video signal of a certain line and the video signals of the preceding and succeeding lines have a high correlation therebetween and that the degrees of the correlation are the same. Thus, the carrier chrominance signal I is selected by the selector circuit 16.

When the compared outputs $L_1$ and $L_2$ of the comparators 17g, 17h are set in $L_1$, $L_2 \leq 0$, the selector circuit 16 selects the signal G which results from delaying the carrier chrominance signal from the one-dimensional filter F-1D by the delay device 11a by one horizontal cycle period. In this case, when the video signal of a certain line and the video signal of the adjacent line are formed of a carrier chrominance signal of a relatively high level and a high band luminance signal of a relatively low level, there occurs no problem. However, when the video signal of a certain line and the video signal of the adjacent line are formed of a carrier chrominance signal of a relatively low level and a high band luminance signal of a relatively high level, the signal G which results from delaying the carrier chrominance signal from the one-dimensional filter F-1D by the delay device 11a by one horizontal cycle period is output from the output terminal TC as the output carrier chrominance signal E. Also, the subtracter 9 subtracts the carrier chrominance signal containing the high band luminance signal of relatively high level from the signal which results from delaying the composite color video signal from the input terminal T1 by the delay device 1a by one frame cycle period and also which results from compensating the same by the delay compensator 11, to thereby lose the high band component of the output luminance signal F developed at the output terminal TY considerably. As a consequence, the resolution of a reproduced picture is lowered and a cross-color occurs in the reproduced picture.

In that case, when it is determined from the reproduced picture by a monitor receiver that the level of the carrier chrominance signal is low, if the reference level Vref from the ID threshold value controller 18 is raised properly, then there is then reduced the possibility that the compared outputs $L_1$ and $L_2$ are set in $L_1$, $L_2 \leq 0$. Therefore, there is then reduced the possibility that the selector circuit 16 selects the signal G which results from delaying the carrier chrominance signal from the one-dimensional filter F-1D by the delay device 11a by one horizontal cycle period. Thus, it is possible to avoid that the resolution of the reproduced picture is lowered to cause the cross-color to occur in the reproduced picture.

Conversely, when the compared outputs $L_1$, $L_2$ of the comparators 17g, 17h are obtained by subtracting the reference level Vref from the respective outputs of the low-pass filters 17e, 17f, if the reference level Vref is lowered, then it is possible to avoid that the resolution of the reproduced picture is lowered to cause the cross-color to occur in the reproduced picture.

Figure 7:
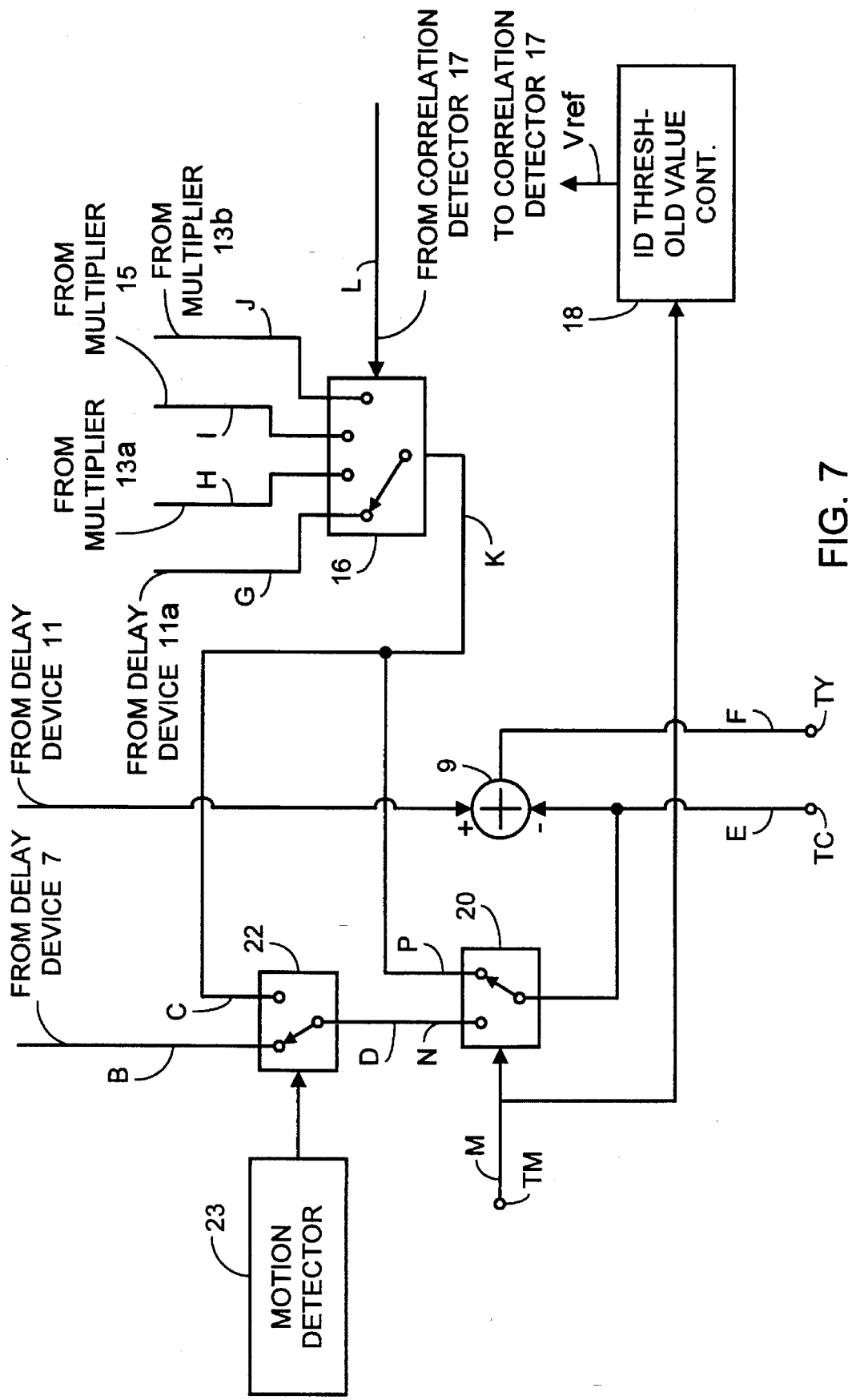
FIG. 7 is a schematic block diagram showing a third embodiment of the Y/C separating filter apparatus according to a third embodiment of the present invention.
Figure 8:
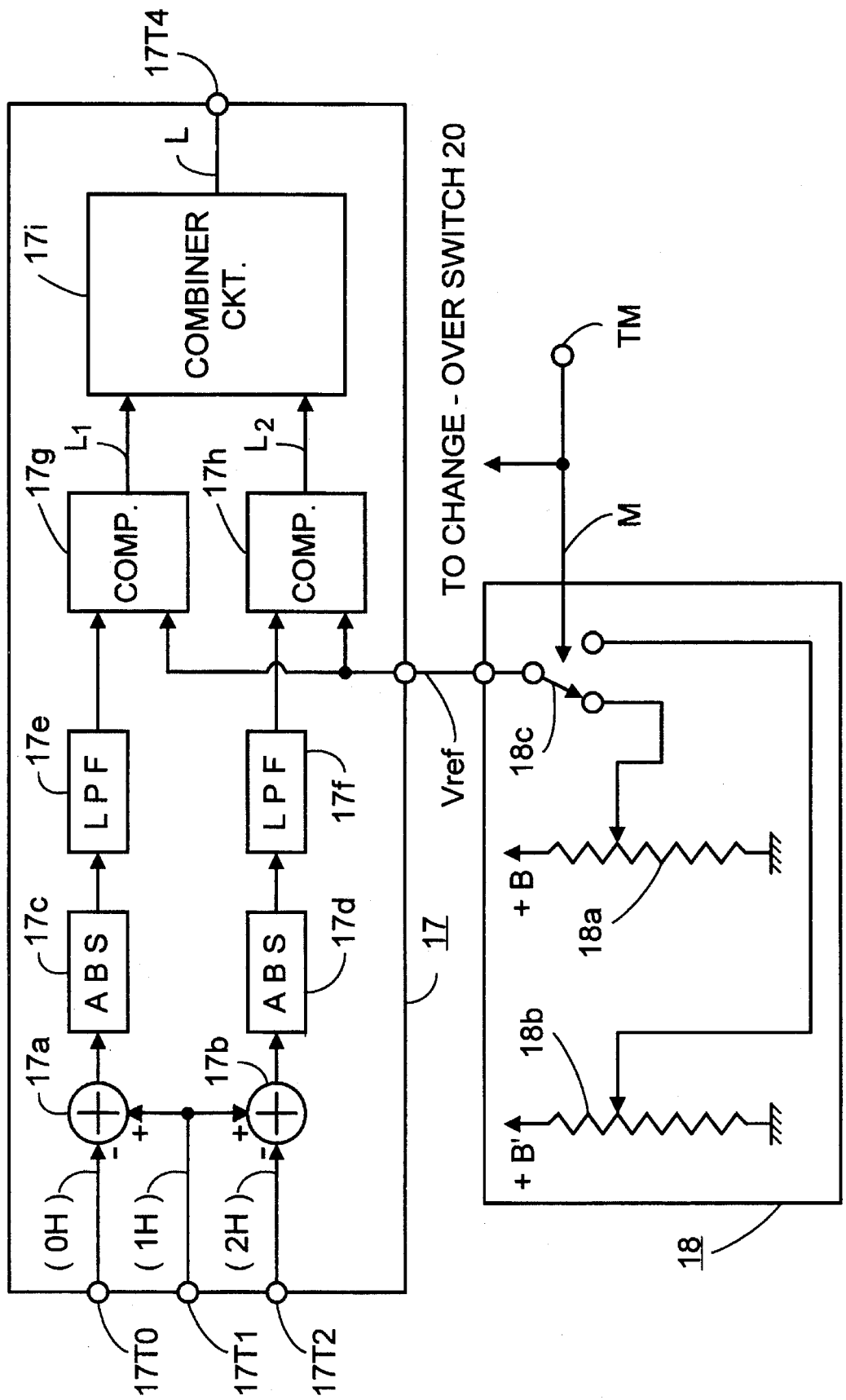
FIG. 8 is a schematic block diagram showing a correlation detector and an ID threshold value controller used in the third embodiment of the present invention.

A further embodiment of the present invention will hereinafter be described with reference to FIGS. 7 and 8. A circuit arrangement of the further embodiment of the present invention will be described with reference to FIG. 7. In this case, most of the circuit arrangement common to that of the embodiment shown in FIG. 2 is not shown and therefore need not be described in detail herein. In this embodiment, a selector circuit 20 is provided to select the outputs of the selector circuits 22, 16 on the basis of a mode switching signal supplied thereto from an input terminal TM in response to a mode, i.e., 3D-2D-1D mode in which the three-dimensional filters F-3Da, F-3Db, the two-dimensional filters F-2Da, F-2Db and one-dimensional filter F-1D, and a mode, i.e., 2D-1D mode where the three-dimensional filters F-3Da, F-3Db of these filters are not used. A variable range of the reference level Vref in the ID threshold value controller 18 can be varied in response to the two modes.

As illustrated, the selector circuit 20 switches the carrier chrominance signal D from the selector circuit 6, i.e., the carrier chrominance signal N and the carrier chrominance signal from the selector circuit 16, i.e., the carrier chrominance signal P in response to the mode switching signal M supplied thereto from the input terminal TM and outputs the output carrier chrominance signal E from the output terminal TC. Also, the subtracter 9 subtracts the output carrier chrominance signal E from the signal which results from delaying the composite color video signal from the input terminal T1 by the delay device 1a by one frame cycle period to thereby output the output luminance signal F from the output terminal TY.

In the case of the 2D-1D mode, as compared with the case of the 3D-2D-1D mode, there is then the large possibility that the selector circuit 16 selects the signal G which results from delaying the carrier chrominance signal from the one-dimensional filter F-1D by the delay device 11a by one horizontal cycle period. Also in this case, when the video signal of a certain line and the video signal of the adjacent line are formed of a carrier chrominance signal of a relatively high level and a high band luminance signal of a relatively low level, there is then no problem. However, when the video signal of a certain line and the video signal of the adjacent line are formed of a carrier chrominance signal of a relatively low level and a high band luminance signal of a relatively high level, the signal G which results from delaying the carrier chrominance signal from the one-dimensional filter F-1D by the delay device 1a by one horizontal cycle period is output from the output terminal TC as the output carrier chrominance signal E. Also, the subtracter 9 subtracts the carrier chrominance signal containing the high band luminance signal of the relatively high level from the signal which results from delaying the composite color video signal from the input terminal T1 by the delay device 1a by one frame cycle period and which also results from compensating the same by the delay compensator 8, thereby the high band component of the output luminance signal F developed at the output terminal TY being lost considerably. As a result, the resolution of the reproduced picture is lowered and hence the cross-color occurs in the reproduced picture.

In the case of the 2D-1D mode, if the reference level from the ID threshold value controller 18 is increased, there is then the low possibility that the compared outputs $L_1$, $L_2$ are set in $L_1$, $L_2 \leq 0$. Also, there is then the reduced possibility that the selector circuit 16 selects the signal G which results from delaying the carrier chrominance signal from the one-dimensional filter F-1D by the delay device 11a by one horizontal cycle period. Therefore, it is possible to avoid that the resolution of the reproduced picture is lowered to cause the cross-color to occur in the reproduced picture.

Therefore, in the ID threshold value controller 18, the potentiometers 18a, 18b are arranged so as to be varied in a ganged relation to each other. Also, a reference level of the potentiometer 18b is constantly made higher than that of the potentiometer 18a. Thus, in the case of the 3D-2D-1D mode, the change-over switch 18c selects the potentiometer 18a. In the case of the 2D-1D mode, the change-over switch 18c selects the potentiometer 18b.

In this embodiment, the ID threshold value controller 18 may generate a fixed low reference level in the case of the 3D-2D-1D and a fixed high reference level in the case of the 2D-2D mode. These two reference levels may be switched by the change-over switch 18c.

Also in this case, when the compared outputs $L_1$ and $L_2$ of the comparators 17g and 17h are obtained by subtracting the reference level Vref from the respective outputs of the low-pass filters 17e, 17f, if the reference level Vref is increased in the case of the 3D-2D-1D mode and the reference level Vref is decreased in the case of the 2D-1D mode, then it is possible to avoid that the resolution of the reproduced picture is lowered to cause the cross-color to occur in the reproduced picture in the 2D-1D mode.

While the carrier chrominance signal from the one-dimensional filter F-1D is supplied to the two-dimensional filters F-2Da and F-2Db as described above, the present invention is not limited thereto and the composite color video signal may be directly supplied to the two-dimensional filters F-2Da, F-2Db.

While the NTSC color composite color video signal is used as described above, the present invention is not limited thereto and the following variant is also possible. That is, in the case of the PAL system, each of the delay times of the delay devices 1a, 1b used in the three-dimensional filters F-3Da, F-3Db may be selected to be 2 frame cycle periods, and each of the delay time of the delay devices 11a, 11b used in the two-dimensional filters F-2Da, F-2Db may be selected to be 2 horizontal cycle periods, respectively. In that case, a motion of the composite color video signal is detected by comparing the composite color video signal and signals which are different from the composite color video signal by 4 frame cycle periods.

According to the present invention, there is provided an Y/C separating filter apparatus in which the output carrier chrominance signal and the output luminance signal are obtained from the composite color video signal supplied thereto. In this Y/C separating filter apparatus having the three-dimensional filter that can obtain the carrier chrominance signal by subtracting the composite color video signal and 1 (or 2) frame cycle delayed and advanced signals, a cross-color occurred in the reproduced picture and a dot-interference occurred in the reproduced picture can be reduced.

Further, according to the present invention, there is provided the Y/C separating filter apparatus, in which regardless of the existence of the motion of the composite color video signal, the high or low line correlation and the characteristic of the reproduced picture, the carrier chrominance signal and the luminance signal can be positively separated from the composite color video signal. Also, according to this Y/C separating filter apparatus, the lowered resolution of the reproduced picture can be reduced and the occurrence of the cross-color in the reproduced picture can be reduced.

Furthermore, according to the present invention, when there are provided the mode in which the two-dimensional filter, the one-dimensional filter and the three-dimensional filter are used and the mode in which the two-dimensional filter and the one-dimensional filter are used but the three-dimensional filter is not used and these two modes are switched, regardless of the existence of the motion of the composite color video signal, the high or low line correlation and the switching of the modes, the carrier chrominance signal and the luminance signal can be reliably separated from the composite color video signal. Also, according to the Y/C separating filter apparatus of the present invention, the resolution of the reproduced picture can be prevented from being lowered and the occurrence of the cross-color in the reproduced picture can be reduced when the modes are switched.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A Y/C separating filter apparatus for outputting a carrier chrominance signal and a luminance signal from an input color video signal supplied thereto, comprising:

a first three-dimensional filter for obtaining the difference in said input color video signal over a first frame interval selected to obtain a first carrier chrominance signal;

a second three-dimensional filter for obtaining the difference in said input color video signal over a second frame interval selected to obtain a second carrier chrominance signal;

means for forming a third carrier chrominance signal by taking an average of said first and second carrier chrominance signals;

a selector circuit responsive to a selection signal for selecting as an output carrier chrominance signal one of said first and second carrier chrominance signals and said third carrier chrominance signal; and a judging circuit for judging first and second correlations of said input color video signal over said first and second frame intervals, respectively, wherein said selection signal is produced in response to a judged result of said judging circuit, so that said selector circuit selects said first carrier chrominance signal when said first correlation is higher than said second correlation, said second carrier chrominance signal when said second correlation is higher than said first correlation, and said third carrier chrominance signal when said first and second correlations are substantially equal.

2. A Y/C separating filter apparatus according to claim 1, wherein said output luminance signal is obtained by subtracting said input color video signal from said output carrier chrominance signal.

3. A Y/C separating filter apparatus comprising:

three-dimensional filter for outputting a first carrier chrominance signal by obtaining the difference in said input color video signal over a first frame interval;

a two-dimensional filter for outputting a second carrier chrominance signal by obtaining the difference between said input color video signal and a signal which is different in one horizontal period and for obtaining the difference between said signal which is different in one horizontal period and a signal which is different in two horizontal periods;

a one-dimensional filter having a frequency characteristic whereby the carrier chrominance signal from said input color video signal is passed;

a first selector circuit for respectively selecting Outputs of said one-dimensional filter and said two-dimensional filter;

a second selector circuit for obtaining an output carrier chrominance signal by selecting the output of said three-dimensional filter and the output of said first selector circuit;

a motion detector circuit for detecting a motion of said input color video signal;

a judging circuit for determining whether a line correlation of said input color video signal is higher than a reference value;

a reference value controller for varying said reference value in response to a characteristic of said input color video signal; and a subtractor for obtaining an output luminance signal by subtracting said input color video signal from the output of said second selector circuit, wherein said second selector circuit is controlled by a detected output of said motion detector circuit, said second selector circuit selects an output of said three-dimensional filter when a motion of said input color video signal is not detected and selects an output of said first selector circuit when a motion of said input color video signal is detected, said first selector circuit is controlled by the output of said judging circuit, and said first selector circuit selects an output of said one-dimensional filter when said correlation is lower than said reference value and selects an output of said two-dimensional filter when said correlation is higher than said reference value.

4. A Y/C separating filter apparatus comprising:

a three-dimensional filter for outputting a carrier chrominance signal by subtracting an input color video signal from a one frame period-delayed signal and subtracting a one frame period delayed signal from a two frame period delayed signal;

a two-dimensional filter for outputting a carrier chrominance signal by obtaining the difference between said input color video signal and a signal which is different in one horizontal period and for obtaining the difference between said signal which is different in one horizontal period and a signal which is different in two horizontal periods;

a one-dimensional filter having a frequency characteristic for passing a carrier chrominance signal from said input color video signal supplied thereto;

a first selector circuit for selecting outputs for said one-dimensional filter and said two-dimensional filter;

a second selector circuit for obtaining an output carrier chrominance signal by selecting an output of said three-dimensional filter and an output of said first selector circuit;

a third selector circuit for obtaining a carrier chrominance signal by selecting the outputs of said first and second selector circuits on the basis of a mode switching signal;

a motion detector circuit for detecting a motion of said input color video signal;

a judging circuit for determining whether a line correlation of said input color video signal is higher than a reference value;

a reference value generator for varying said reference value by said mode switching signal; and a subtracter for obtaining an output luminance signal by subtracting said input color video signal from the output of said third selector circuit, wherein said second selector circuit is controlled by a detected output of said motion detector circuit, said second selector circuit selects the output of said three-dimensional filter when a motion of said input color video signal is not detected, and selects the output of said first selector circuit when a motion of said input color video signal is detected, wherein said first selector circuit is controlled by an output of said judging circuit, said first selector circuit selects the output of said one-dimensional filter when said line correlation is lower than said reference value, and selects the output of said two-dimensional filter when said line correlation is higher than said reference value.

5. The Y/C separating filter apparatus according to claim 3 or 4, wherein said one-dimensional filter is a bandpass filter.

* * * * *

UNITED STATES PATENT AND TRADEMARK OFFICE
CERTIFICATE OF CORRECTION

PATENT NO. : 5,473,389
DATED : December 05, 1995
INVENTOR(S) : Toru Eto and Tadao Fujita It is certified that error appears in the above-indentified patent and that said Letters Patent is hereby corrected as shown below:

<u>In the claims</u>:

Col.13, line 30, change "Outputs" to --outputs--

Signed and Sealed this

Sixteenth Day of September, 1997

Attest:

BRUCE LEHMAN

*Attesting Officer*      *Commissioner of Patents and Trademarks*